United States Patent [19]
Enderle et al.

[11] Patent Number: 4,560,213
[45] Date of Patent: Dec. 24, 1985

[54] GAS BEARING

[75] Inventors: Eckhard Enderle, Aalen; Dieter Kaufmann, Heidenheim, both of Fed. Rep. of Germany

[73] Assignee: Carl-Zeiss-Stiftung, Heidenheim/Brenz, Fed. Rep. of Germany

[21] Appl. No.: 675,000

[22] Filed: Nov. 27, 1984

[30] Foreign Application Priority Data

Dec. 1, 1983 [DE] Fed. Rep. of Germany ....... 3343470

[51] Int. Cl.[4] .................................... F16C 32/06
[52] U.S. Cl. ................................. 308/5 R; 384/99
[58] Field of Search ............... 308/5 R, 3 A; 384/105, 384/104, 103, 99

[56] References Cited

U.S. PATENT DOCUMENTS

| | | | |
|---|---|---|---|
| 4,413,864 | 11/1983 | Phillips | 308/5 R |
| 4,449,834 | 5/1984 | Franken et al. | 384/99 |
| 4,461,517 | 7/1984 | Enderle | 308/5 R |
| 4,462,700 | 7/1984 | Agrawal | 384/105 |

*Primary Examiner*—Lenard A. Footland
*Attorney, Agent, or Firm*—Hopgood, Calimafde, Kalil, Blaustein & Judlowe

[57] ABSTRACT

A load-compensated gas bearing comprises a base body (1) and a deformable bearing membrane (3) having a central opening for gas flow into a bearing interspace (17). The membrane is suspended from the base body via a ring-shaped web (4) which provides compliant tilt action at a tilt-bearing region (22) of connection to the base body (1). The base body (1) and the membrane (3) form an inner bearing chamber which is separated by the tilt bearing (22) into an outer chamber (9) surrounding the inner chamber (10). Under the action of an external force F on the bearing in the direction to reduce the bearing interspace (17), the membrane (3) is bent in concave shape as a result of the gas-pressure distribution within the bearing interspace (17). In reaction to central concave deformation of the membrane (3), and by reason of tilt-bearing support radially short of the outer edge (23) of the membrane (3), the outer edge (23) is displaced, lever-like, in the direction to constrict the exhaust flow of gas from the interspace (17), thereby causing load pressure of gas in the interspace to act in opposition to closure of the interspace.

23 Claims, 6 Drawing Figures

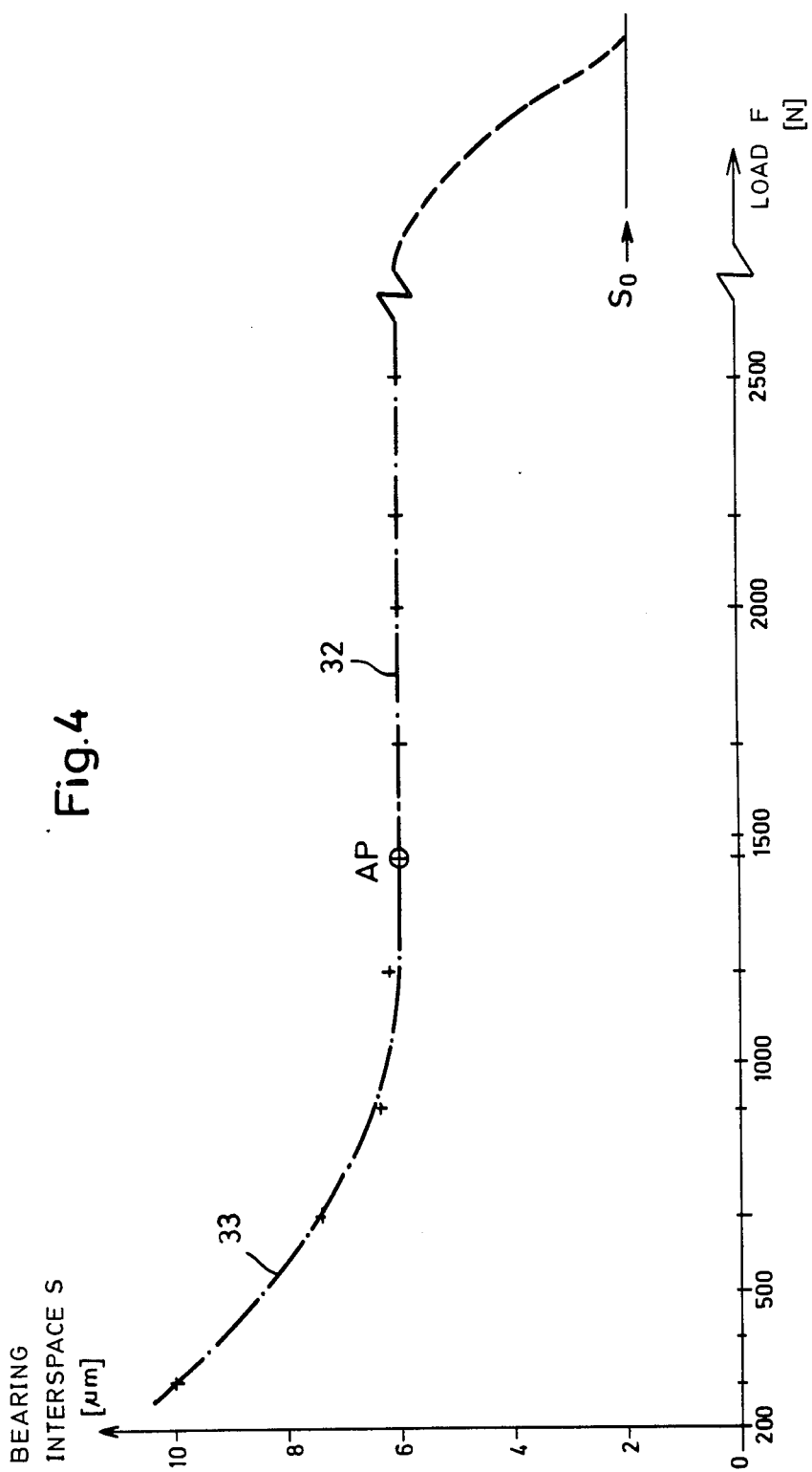

GAS BEARING

BACKGROUND OF THE INVENTION

The present invention relates to load-compensating mechanism for a gas bearing, in order to maintain a constant bearing gap within a certain load range, wherein the mechanism includes a flexible surface, developed as a metal membrane, on the support side of the gas bearing.

In various fields of use, for example when gas bearings are used for the support of portals of a measuring machine, it is desirable to maintain a constant bearing gap regardless of the load on the bearing, i.e., bearings of very high stiffness are required.

Such a bearing is described in Swiss Patent No. 604033. The known gas bearing contains a resilient support side which is developed as a compliant membrane. This membrane is connected centrally with the base body of the bearing; the edge of the membrane is movably sealed against the inner edge of the bearing housing. The feeding of gas takes place centrally, through the center of the membrane. The membrane and the bearing housing in this way form an inner bearing chamber. In front of this chamber is a choke (bearing nozzle) within the central gas-feed line; and behind the choke, a passage connects the inner bearing chamber with a gas-feed line. The supply pressure $P_O$ is reduced by the choke to the load-dependent pressure $P_L$. The pressure $P_L$ also prevails in the inner bearing chamber. The stream of gas flows through the central opening in the membrane between the bottom of the membrane and the opposite bearing surface, i.e., the bearing interspace, and emerges at the edge of the bearing. A pressure drop develops along the membrane, from the central gas-feed opening and to the outlet openings.

The cooperative reaction between load pressure $P_L$ in the inner bearing chamber and the pressure drop in the bearing gap is to bend the edge of the membrane in the direction toward the opposite bearing surface. Membrane shape exhibits a convergence in the direction of the stream of gas. Every load increase within a certain load range increases the convergence of the membrane and lifts the bearing, thereby compensating for load-dependent reductions in the bearing gap.

In this way, high rigidity is obtained within a certain operating range.

Stiffness of the described bearing can be increased by providing increased compensation of the bearing. This is obtained by developing a larger membrane surface on the inner-chamber side of the bearing than the active membrane surface on the guide side.

This increased compensation is obtained, however, at a cost disadvantage, in that the membrane of a bearing with increased compensation must be larger than the membrane of a simply compensated bearing; also, the bearing housing must also have a larger circumference than is actually necessary, based on the support surface. And this limitation is not desirable in many cases of use.

Furthermore, the action of this bearing is dependent on the pressure difference between $P_O$ and $P_L$ which develops above the bearing nozzle (choke). However, with high loads, this pressure drop no longer occurs, so that the convergence of the membrane then no longer increases, and the stiffness of the bearing thus decreases.

BRIEF STATEMENT OF THE INVENTION

The object of the present invention is to develop a load-compensated gas bearing of high stiffness with which increased compensation can be gained without having to change the membrane surfaces and thus the dimensions of the bearing housing.

The invention achieves this object by so supporting the stiffly compliant membrane of a gas bearing of the character indicated that gas pressure in the bearing interspace is operative to concavely bend the membrane, with its concaved surface facing the guide surface. The nature of the support for the membrane is a flexible tilt-bearing ring or web, at a radius intermediate a central region and an outer annular region, so that upward concave deflection within the central region is accompanied by outer-edge deflection in the direction of the guide surface. The result is to enable constant interspace offset from the tilt-bearing region to the guide surface, over a wide range of load variation.

The invention relies upon a lever-like action at the locale of tilt-bearing support, whereby a concaved upward deflection of the central region of the membrane is accompanied by a downward deflection of the outer edge of the outer annular region. An inner bearing chamber, behind the central region of the membrane, is vented, thus enabling greater bending-force development than in the prior device of said Swiss patent, and the pressure difference between the bearing gap and the inner bearing chamber is not reduced upon an increase of load to the extent that it is reduced in the prior device. Thus, the stiffness of a gas bearing of the invention is increased as compared with the prior device.

Furthermore, the bearing of the invention can carry a greater load since the effective surface on the support side of the membrane is not reduced by the compensation.

A further increase in the compensation is readily obtained in the bearing of the invention, by making it possible for the edge region of the membrane to be responsive to load pressure $P_L$, thus enhancing bend action of the edge of the membrane. The inner bearing chamber continues to remain vented. In providing such a gas bearing of increased compensation, the dimensions of the bearing housing can remain unchanged, and it is merely necessary to provide an additional hole and an additional sealing means, for which the base body can already have been prepared, to allow for insertion and-/or opening only in case of need.

A still further increase in compensation can also be realized by bringing the inner bearing chamber to a lower pressure than atmospheric pressure, to thus bend the membrane to an increased concave extent, i.e., in the region between the central gas opening of the membrane and the tilt-bearing web from which the membrane is suspended. By additional variation of the pressure in the bearing interspace the stiffness of the bearing can be controlled or undesired oscillatory resonances can be extinguished. The two methods of increasing the compensation of the bearing which have been described can be used individually or in combintion, depending on the context of use.

DETAILED DESCRIPTION

The invention will be illustratively described in detail, in conjunction with the accompanying drawings, in which:

FIG. 1b is an enlarged fragmentary view to show detail of a relationship in the bearing of FIG. 1a, the detail region being encircled and identified 1b in FIG. 1a.

FIG. 4 is a characteristic curve for the load-compensated bearing of FIGS. 1 and 2.

Figure 1A:
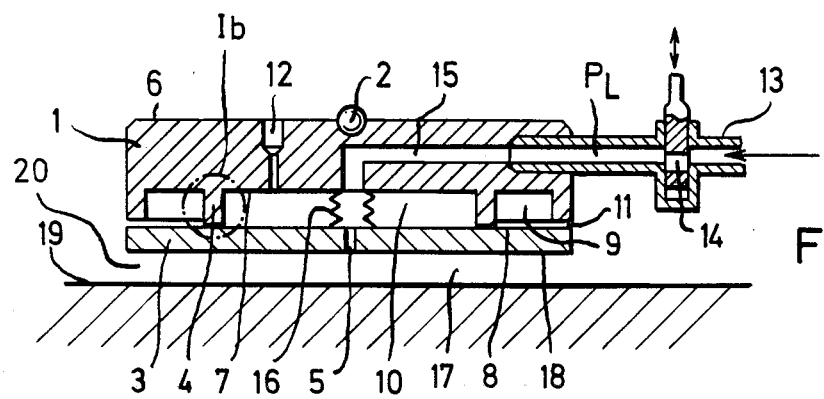
FIG. 1a is a simplified diagram of a load-compensated gas bearing in unloaded condition, shown in cross section.
Figure 1B:
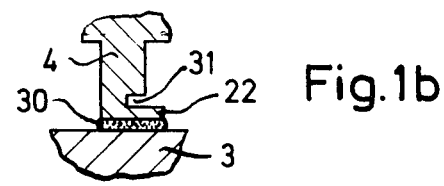

The gas bearing shown in FIG. 1 has a base body 1 having on its upper side 6 a ball 2 to receive a load and having on the bottom side 7 features and connections for a compliant membrane 3. The base body 1 and membrane 3 are of circular shape. The membrane 3 is fastened to a web 4 by a gas-tight adhesive connection 30. Web 4 is of annular shape concentric with the circular perimeter of base body 1. At connection with membrane 3, the web 4 is characterized by a relatively wide surface so that a large-area adhesive connection 30 is obtained, as shown in FIG. 1b. Adjoining the adhesive connection 30, on the side toward the base body 1, an annular groove 31 reduces the section area of web 4, whereby the part 22 of the web that is adhered to membrane 3 acts as a tilt-bearing, flexibly connected to the web. A hole 5 in the center of the membrane 3 serves as a gas-feed opening. The base bottom 7 and the upper surface 8 of the membrane define an intermediate space which is divided by web 4 into an outer bearing chamber 9 and an inner bearing chamber 10. The outer chamber 9 is vented via a circumferential opening 11, and the inner chamber 10 is vented via a port 12. The bearing is supplied with a flow of gas, for example air under pressure $P_O$, via a supply connection 13. Pressure fluid (gas) is conducted via a passage 15 in the base body 1, and via an axially compliant seal 16 and the central gas-feed opening 5 into the bearing gap 17, the latter being defined by and between the bottom 18 of the membrane and the confronting upper surface of a guide 19. The gas emerges from the bearing, via the outer periphery 20 of the bearing gap 17. Between the supply line 13 and bearing 1, a choke 14 enables adjustment of the flow of pressure fluid.

On the downstream side of choke 14, the gas has a load-dependent bearing pressure $P_L$.

Figure 2:
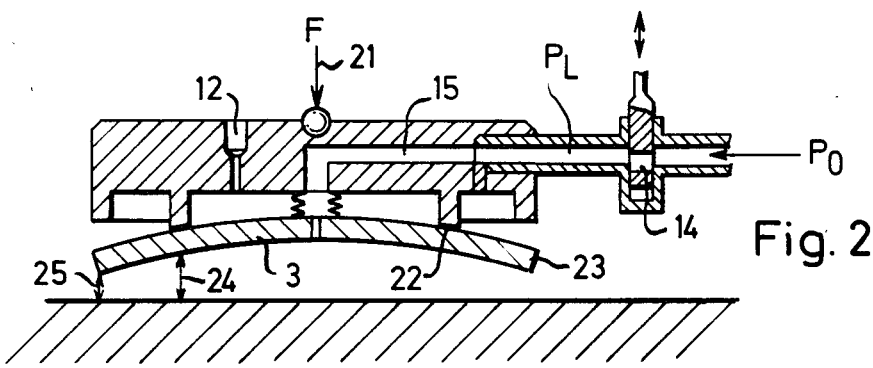
FIG. 2 is a diagram to show the bearing of FIG. 1 under partial load.

FIG. 2 shows the action of the thrust bearing under the influence of an externally applied force, namely, a force F in the direction of arrow 21 acting on the surface of ball 2. This force is in the direction to compress the bearing gap 17, with resulting increase in load-dependent pressure $P_L$ in the bearing gap 17.

This increase in pressure is operative to develop a concave bend in the central region of membrane 3, i.e., in the region surrounding the gas-feed opening 5 and contained within web 4. At the same time, and by reason of flexible fulcrum action at tilt bearing 22, the outer remainder of membrane 3 (i.e., the annular region between tilt bearing 22 and the outer edge 23 of membrane 3) is deflected in the direction toward the guide-bearing surface 19. As a result of this bend and deflection, the relative distance or off-set between the lower membrane surface 18 and guide-bearing surface 19, represented by the double-ended arrow 24, is again brought to the value which it had in unloaded condition, even though the gas-outlet area 20 has become smaller than in the unloaded condition shown in FIG. 1; this reduced area is represented by a double-ended arrow 25. In the final result, the distance 24 of the bearing from the guide surface 19 is, as a whole, not changed, and one has obtained a bearing of very great stiffness.

Figure 3:
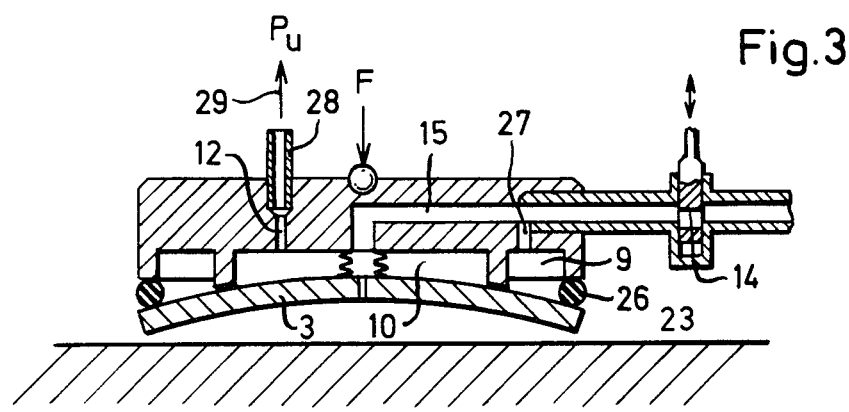
FIG. 3 is a diagram similar to FIG. 2 for the case of a load-compensated bearing with greater compensation.

FIG. 3 shows a thrust bearing under load in which two additional measures of increased compensation are provided. First of all, the outer bearing chamber 9 is sealed off from the surrounding atmosphere by an elastomeric seal 26, for example, a toroidal sealing ring. The load-dependent pressure $P_L$ is supplied to the chamber 9 through a port connection 27 to passage 15. In this way, in addition to the effect described in connection with FIG. 2, the outer annular region of membrane 3 (between fulcrum 22 and edge 23) is pressure-loaded in the direction of guide surface 19, thereby further reducing the gas outlet 20.

As a further measure to increase load compensation, air can be drawn out of the inner bearing chamber 10 via an exhaust connection 28 at the vent hole 12, thereby establishing within the inner chamber 10 a pressure $P_u$ which is less than the atmospheric pressure surrounding the bearing. This further measure effects further concave bending of the inner part of the membrane 3 in the direction toward the bottom 7 of the bearing housing, and a further increase in load compensation is achieved. The two measures for increasing the compensation, namely the increase of the pressure in the outer chamber 9 and the reduction of the pressure in the inner chamber 10, may be employed simultaneously or each can be used individually.

It will be understood that FIGS. 1 to 3 have not been drawn to scale in all details. Thus, for instance, the bending of membrane 3 has been exaggerated so that its action can be clearly emphasized. Furthermore, sealing surfaces and sealing elements, such as the toroidal sealing ring 26, have been shown exaggerated. In actuality, the bending of the membrane and thus the distances apart in the bearing intermediate space 17 are in the $\mu m$ order of magnitude (about 2 to 10 $\mu m$); and the bending of the membrane and dimensioning of the toroidal sealing ring are to be understood in this context.

FIG. 4 shows a characteristic curve 33 of the load-compensated gas bearing of FIG. 1, in accordance with the invention. Along the ordinate, the bearing gap S is plotted in $\mu m$, being the measure of offset 24 between bottom 18 of the membrane 3 (measured below the tilt bearing 22) and the guide surface 19. The acting force F is plotted, in Newtons, along the abscissa. An operating point AP has been selected, where F is 1450 N and S is 6 $\mu m$. It can be seen that a wide range 32 of infinitely high rigidity exists between F = 1400 N and F = 2500 N. Upon further increase in load, a reduction of the bearing offset is to be expected, as a result of which the distance S drops to a value $S_O$ which is reached when the membrane edge 23 lies on the bearing surface 19. This part of the curve is shown by a dashed line, but not to scale.

If the measures of increased compensation described in connection with FIG. 3 are used, the result can be obtained that the horizontal region 32 of the characteristic curve is converted into an ascending region. One then obtains a bearing of negative stiffness.

The described embodiments of the load-compensated bearing of the invention act independently of whether the operating pressure fluid is a compressible gas such as air or whether the operating pressure fluid is a noncompressible liquid such as water or oil. In the present illustrative embodiments, air has been used as the operating fluid.

It should be noted that, for simplified discussion, the membrane 3 has been shown to have been initially flat, and then to have become upwardly dished in response to interspace fluid pressure, under load conditions. It will, however, be clear that the membrane 3 may be initially formed with an upwardly dished profile (as in FIG. 2), in which case the development of interspace fluid pressure under load conditions will produce the result of further upwardly dished deformation within ring 4 and of further downward deflection of the outer circular edge of membrane 3. This being the case, the self-compensating property of the bearing will be as already described, regardless of whether the membrane 3 is flat or is initially upwardly dished in the no-load condition.

Figure 3A:
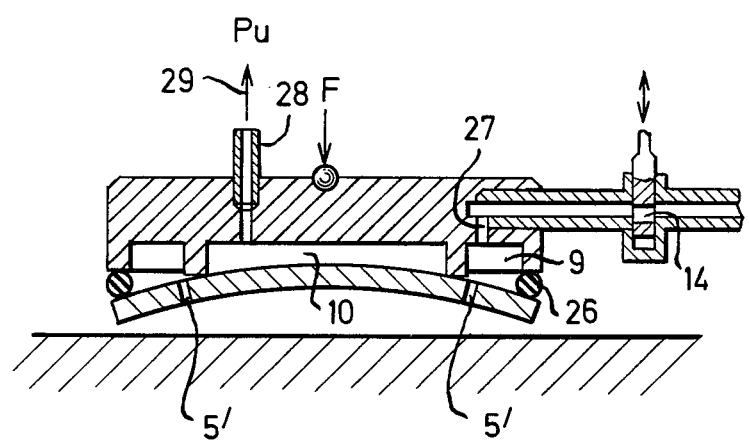
FIG. 3a is a diagram similar to FIG. 3 to show a modification.

Also it should be noted that, for the case of a flexible circumferential seal 26 between the housing and the outer circular edge of membrane 3, wherein an annular chamber 9 is defined between ring 4 and the seal 26, it is not necessary that pressure fluid be supplied to the interspace 17 via an aperture 5 in the central region of membrane 3. For example, FIG. 3a is illustrative of an arrangement wherein one or more membrane openings 5′ rely soley on annular chamber 9 as a manifold for supplying the flow of pressure fluid to the interspace 17.

What is claimed is:

1. A gas bearing the support side of which is developed as a resilient membrane (3) which is concavely shaped by the bearing pressure ($P_L$), characterized by the fact that the membrane (3) rests on tilt bearings (22) whose distance apart is less than the size of the membrane (3) and a chamber (9, 10) formed by the membrane (3) and a bottom (7) of a bearing housing (1), is at least partially vented.

2. A gas bearing according to claim 1, characterized by the fact that the tilt bearing or bearings (22) are formed by a ring-shaped web (4) to which the membrane (3) is fastened and which divides the bearing chamber between membrane (3) and bearing base body (1) into an outer part (9) and an inner part (10).

3. A gas bearing according to claim 2, characterized by the fact that the inner bearing chamber (10) is acted on by atmospheric pressure.

4. A gas bearing according to claim 2, characterized by the fact that the outer bearing chamber (9) which surrounds the inner chamber (10) is sealed off by an elastic seal (26) and is filled with the load-dependent supply pressure through a hole ( 27).

5. A gas bearing according to claim 2, characterized by the fact that the inner bearing chamber (10) is maintained via a connection (28) at a pressure below atmospheric pressure.

6. A gas bearing according to claims 4 or 5, characterized by the fact that the outer bearing chamber (9) is sealed off by an elastic seal (26) and filled with the load-dependent supply pressure and that the inner bearing chamber (10) is maintained via the connection (28) at a pressure below atmospheric pressure.

7. A gas bearing according to claim 2, characterized by the fact that the membrane (3) is fastened to the web (4) by an elastic adhesive connection.

8. A gas bearing according to claim 7, characterized by the fact that the adhesive connection (30) is developed with a broad surface and that the web (4) has a groove-like reduction in area (31) above the adhesive surface (30) in order to increase the bendability of the web (4).

9. A gas bearing according to claim 1, characterized by the fact that a choke (14) is arranged outside the gas bearing in order to maintain the flow of gas constant.

10. A gas bearing according to any one of claims 1 to 5 and 7 to 9 characterized by its use for supporting portals of multiple coordinate measuring machines.

11. A pressure-fluid bearing element for use in supporting a load at an interspace offset from the confronting surface of a flat guide, comprising a bearing housing having an upper surface adapted to receive a downward application of load force, said housing having a lower surface that is characterized by a downwardly extending circular ring, a stiffly compliant circular membrane of greater radial extent than said ring and concentrically retained in circumferential contact with said ring, whereby a bearing chamber is defined by and between said housing and said member and within the confines of said ring, said membrane having an opening for discharge of pressure fluid into an interspace between said membrane and a confronting flat guide surface and said bearing chamber being at least partially vented, and means including a passage in said housing and a connection within said chamber to the opening of said membrane for delivering pressure fluid to the interspace, whereby in response to interspace fluid pressure under load said membrane will be deformed upwardly into said chamber while its outer circular edge is displaced in the direction to restrict the interspace.

12. The pressure-fluid bearing element of claim 11, in which the partial venting of said bearing chamber is via an exhaust port in said housing.

13. The pressure-fluid bearing element of claim 12, in which chamber-evacuating means is connected to said exhaust port.

14. The pressure-fluid bearing element of claim 11, in which the lower end of said ring is formed with a compliant tilt-bearing flange that is secured to the confronting upper surface of said membrane.

15. The pressure-fluid bearing element of claim 11, in which the outer circular edge of said membrane is yieldably and circumferentially sealed to said housing, thereby defining an annular chamber between said ring and the sealed edge, said last-defined means including a passage for delivering pressure fluid to said annular chamber.

16. The pressure-fluid bearing element of claim 11, in which said membrane is flat in the no-load condition and is upwardly deformed within said ring in response to interspace fluid pressure under load.

17. The pressure-fluid bearing element of claim 11, in which said membrane in the no-load condition is of upwardly dished configuration within said ring and is further upwardly deformed within said ring in response to interspace fluid pressure under load.

18. A pressure-fluid bearing element for use in supporting a load at an interspace offset from the confronting surface of a flat guide, comprising a bearing housing having an upper surface adapted to receive a downward application of load force, said housing having a lower surface that is characterized by a downwardly extending circular ring, a stiffly compliant circular membrane of greater radial extent than said ring and concentrically retained in circumferential contact with said ring, whereby an inner bearing chamber is defined by and between said housing and said member and within the confines of said ring, said membrane having an opening for discharge of pressure fluid into the interspace between said membrane and a confronting flat guide surface and said inner bearing chamber being at least partially vented, and passage means in said housing and communicating with the opening of said membrane to the exclusion of said inner bearing chamber for delivering pressure fluid to the interspace, whereby in response to interspace fluid pressure under load said membrane will be deformed upwardly into said chamber while its outer circular edge is displaced in the direction to restrict the interspace.

19. The pressure-fluid bearing element of claim 18, in which pressure-fluid communication to said opening is via a flexible passage through said inner bearing chamber.

20. The pressure-fluid bearing element of claim 18, in which a yieldable circumferential seal between said housing and the outer circular edge of said membrane defines an annular chamber between said ring and the sealed edge, and in which the opening in said membrane is within the confines of said ring, said passage means having further communication with said annular chamber.

21. The pressure-fluid bearing element of claim 18, in which a yieldable circumferential seal between said housing and the outer circular edge of said membrane defines an annular chamber between said ring and the sealed edge, and in which the opening in said membrane is in communication with said annular chamber.

22. The pressure-fluid bearing element of claim 21, in which said opening is one of an angularly spaced plurality of openings in said membrane.

23. The pressure-fluid bearing element of claim 22, in which all of the openings in said membrane are in communication with said annular chamber.

* * * * *